Jan. 22, 1935.  U. KOHLER  1,988,983
DRIVING MECHANISM
Filed March 9, 1931
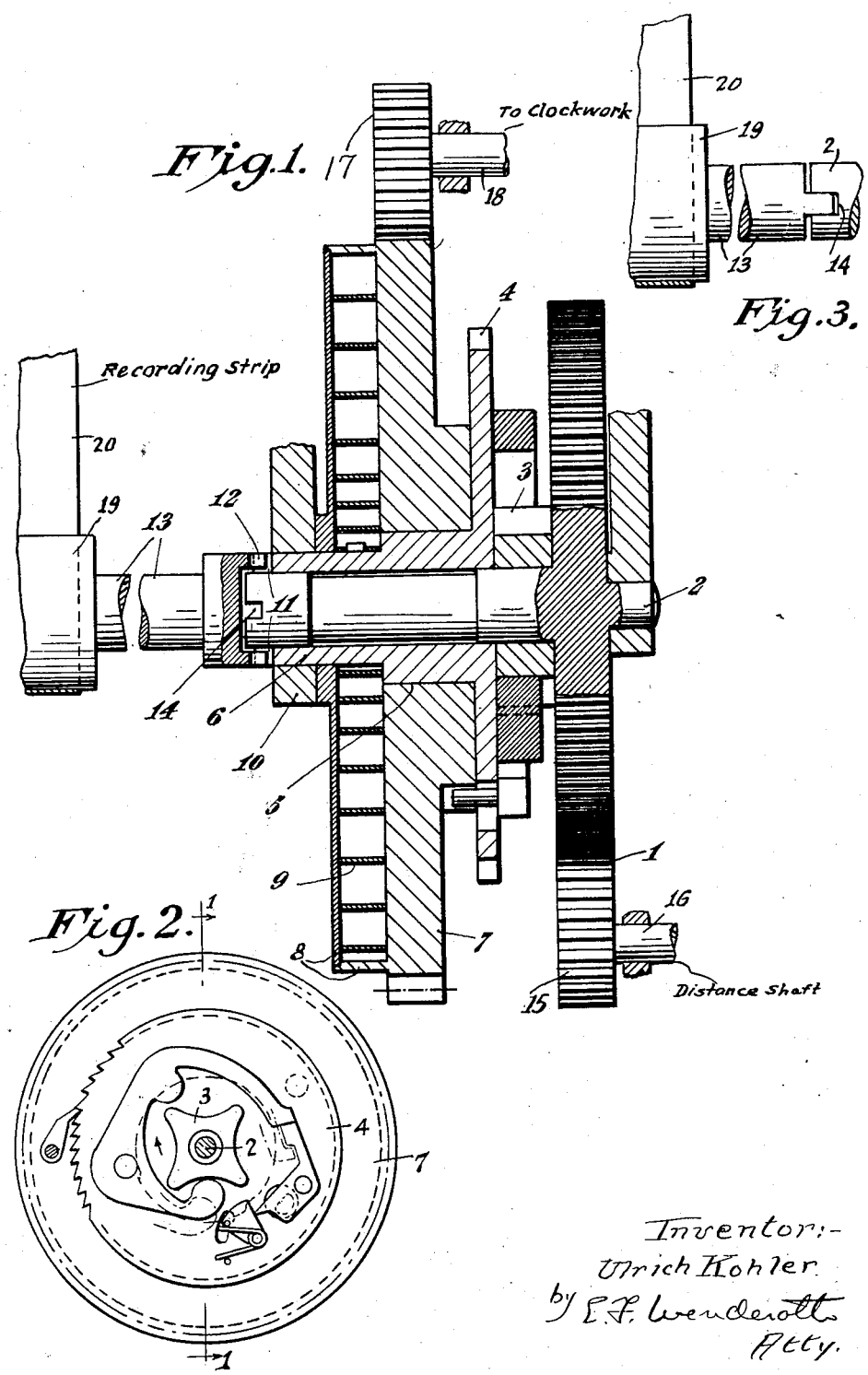

Patented Jan. 22, 1935

1,988,983

UNITED STATES PATENT OFFICE 1,988,983

DRIVING MECHANISM

Ulrich Kohler, Berne, Switzerland, assignor to Hasler A.-G. vormals Telegraphenwerkstatte von G. Hasler, Berne, Switzerland, a corporation of Switzerland Application March 9, 1931, Serial No. 521,375
In Switzerland March 12, 1930

2 Claims. (Cl 185—38)

This invention relates to devices for driving the record strips or bands of recording tachometers.

In known recording tachometers having a record surface moved at a uniform speed the said surface is driven by the time shaft of a clockwork. This drive has the disadvantage that the spring of clockwork is loaded more or less to a varying extent according to the checks which the clockwork experiences owing to the feed of the paper.

This invention has for one of its objects to obviate these defects.

According to the invention, there is provided a clockwork which is continuously wound up in known manner by a running axle of the vehicle, and wherein, for this purpose, the running axle is coupled at regular intervals of time with the winding device for the clockwork. The main spring of the clockwork is entirely relieved in this manner from the paper feed because the latter is effected by that wheel of the winding device which is rotated periodically by the running axle, so that a relatively small driving mechanism can be used for all sizes of the recording device.

Further, the invention enables a change to be readily made from uniformly feeding the paper band to driving it in correspondence with the distance traveled.

According to a feature of the invention, the hub of the winding wheel for the main spring of the clockwork has an extension by which the feed mechanism of the record member is driven.

When the winding wheel serving for loading the main spring is freely rotatable on a shaft driven by the running axle of the vehicle, according to another feature of the invention the said shaft is arranged to drive the record member according to the distance traversed by the vehicle.

An embodiment of the invention is shown by way of example in the accompanying drawing, in which Figure 1 is a cross sectional view with certain parts shown in elevation, Figure 2 shows a partial elevational view of the coupling, and Figure 3 is a partial elevational view of the connection between the recording strip mechanism and the main shaft.

In the drawing similar reference characters refer to like parts. Spur gear 1 is driven by gear wheel 15 upon the shaft 16 whose velocity is to be measured. In other words, gear 1 is driven from the distance shaft. This driving means is well known and forms no part of the invention.

Spur gear 1 which is driven as above noted by that shaft or measuring member of the tachometer which is to be measured is secured fixedly upon shaft 2 which carries also a coupling wheel 3 beside the gear 1. The coupling wheel 3 intermittently transmits its rotation in any conveniently known manner, preferably as shown in elevational view in Figure 2. The specific construction of the coupling mechanism is described in companion application now Patent 1,838,843, granted December 29th, 1931, Clockwork driving mechanism in tachometers and the like.

The wheel 3 intermittently transmits its rotation to a locking wheel 4 which is prevented from rotating backwardly. The wheel 4 is provided with shouldered hub 5, 6. A spring barrel wheel 7 is provided freely rotatable upon the hub portion 5 which is of larger diameter, while the inner end of a spiral spring 9 which is housed in the spring barrel 8 formed or provided on the wheel 7 is attached by any desired means such as hooking the same, to the part 6 of the hub which is of smaller diameter.

The wheel 7 meshes with gear 17 which drives the shaft 18 of any desirable clockwork of a clock belonging to the speedometer assembly. The clockwork has not been shown and can be of any suitable character.

The part 6 of the hub extends beyond the barrel 8 and extends through a bearing 10 and is provided at its end with two recesses 11. A shaft 13 is provided with two claws or projections 12 which are adapted to engage in the recesses 11. The shaft 13 is preferably flexible and drives the paper recording band 20 of the tachometer by means of a shift roller 19. Any other desired means for driving the recording strip can be utilized. Also it is understood that the shaft 13 can be directly connected with the shift roller as shown or can, if desired, actuate such roller through a transmission drive.

When the coupling between the wheels 3 and 4 is suitably designed, the wheel 4 rotates in a predetermined unit time, e. g. one minute, as many revolutions as the spring barrel 8, that is to say, sufficiently to impart to the record strip or band 20 an average uniform speed. It will be noted that due to the construction described, the main spring 9 of the clockwork is therefore not used in driving the record strip 20 and due to this construction the operation of the clockwork can in no way be prejudiciously affected by the recording mechanism.

If the record band is to be fed according to the distance traveled by the vehicle equipped with the tachometer, without making any constructional change in the driving device the shaft 13 can be coupled with the shaft 2 instead of with the hub 6. For this purpose, the shaft 2 has in its end adjacent the bearing 10 a diametral groove 14 with which a corresponding claw of the shaft 13 is brought into engagement, as shown in Figure 3.

The described driving device thus enables the record member to be driven according to time or distance without making any change in the gearing involving a toothed wheel.

I claim:—

1. In a recording tachometer, the combination of a shaft arranged to be driven by a running axle of the vehicle, a clockwork comprising a main spring surrounding said shaft, a winding device for the main spring comprising a winding wheel free to rotate about said shaft and arranged to be driven intermittently thereby, which wheel has a hub extending through said spring towards one end of the shaft, and means for driving a record member arranged to engage either said hub or said shaft.

2. In a recording tachometer, the combination of a shaft arranged to be geared with the running axle of a vehicle, a clockwork comprising a main spring attached to said shaft, a winding device for the main spring comprising a winding wheel free to rotate in only one direction about said shaft and arranged to be intermittently rotated thereby in said direction, which wheel has a hub extending through said spring towards one end of the shaft, and a shaft for driving a record member arranged to engage either said hub or said end of the shaft.

ULRICH KOHLER.